(12) United States Patent
Narahara et al.

(10) Patent No.: US 10,156,182 B2
(45) Date of Patent: Dec. 18, 2018

(54) COMBUSTION CHAMBER STRUCTURE FOR DIRECT INJECTION ENGINE

(71) Applicant: MAZDA MOTOR CORPORATION, Hiroshima (JP)

(72) Inventors: Kazuaki Narahara, Hiroshima (JP); Noriyuki Ota, Hiroshima (JP); Yoshihisa Nou, Hiroshima (JP); Akira Kageyama, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/538,403

(22) PCT Filed: Dec. 25, 2015

(86) PCT No.: PCT/JP2015/006488
§ 371 (c)(1),
(2) Date: Jun. 21, 2017

(87) PCT Pub. No.: WO2016/103735
PCT Pub. Date: Jun. 30, 2016

(65) Prior Publication Data
US 2017/0356330 A1 Dec. 14, 2017

(30) Foreign Application Priority Data
Dec. 25, 2014 (JP) .................. 2014-262406

(51) Int. Cl.
*F02B 17/00* (2006.01)
*F02B 23/10* (2006.01)
*F02F 3/24* (2006.01)

(52) U.S. Cl.
CPC ............ *F02B 23/10* (2013.01); *F02B 23/101* (2013.01); *F02B 2023/102* (2013.01); *F02F 3/24* (2013.01); *Y02T 10/125* (2013.01)

(58) Field of Classification Search
CPC .............. F02B 17/005; F02B 2075/125; F02B 23/101; F02B 23/0648; F02B 23/0651; F02M 61/1813; F02F 3/26
(Continued)

(56) References Cited

U.S. PATENT DOCUMENTS 5,927,244 A * 7/1999 Yamauchi ............. F02B 23/101
123/295
6,418,905 B1 7/2002 Baudlot et al.
(Continued)

FOREIGN PATENT DOCUMENTS

JP H10-131758 A 5/1998
JP H11-200867 A 7/1999
(Continued)

OTHER PUBLICATIONS

International Search Report issued in PCT/JP2015/006488; dated Mar. 8, 2016.

*Primary Examiner* — John Kwon
(74) *Attorney, Agent, or Firm* — Studebaker & Brackett PC

(57) ABSTRACT

A fuel injection valve is provided for a ceiling portion of a cylinder head. A tip of an ignition electrode is arranged in the vicinity of an injection tip of the fuel injection valve. A recess is provided for the ceiling portion. A center of a cavity is shifted with respect to a bore center of the cylinder. In a vertical cross-section of the inside of a combustion chamber taken along a plane passing through the injection tip of the fuel injection valve and the tip of the ignition electrode, a distance from the injection tip to a wall surface of the cavity at a side at which the ignition electrode is provided is longer than a distance from the injection tip to a wall surface of the cavity at an opposite side.

7 Claims, 8 Drawing Sheets

(58) Field of Classification Search
USPC .................................. 123/295, 298, 305, 307
See application file for complete search history.

(56) References Cited

U.S. PATENT DOCUMENTS

| | | |
|---|---|---|
| 2002/0134344 A1 | 9/2002 | Sebastian et al. |
| 2005/0098145 A1* | 5/2005 | Tsuchida ............... F02B 17/005 123/299 |
| 2008/0022967 A1 | 1/2008 | Tanaka et al. |
| 2015/0144093 A1 | 5/2015 | Harada et al. |

FOREIGN PATENT DOCUMENTS

| | | |
|---|---|---|
| JP | 2002-511549 A | 4/2002 |
| JP | 2003-534485 A | 11/2003 |
| JP | 2005-139988 A | 6/2005 |
| JP | 2009-019502 A | 1/2009 |
| JP | 2010-037948 A | 2/2010 |
| JP | 2010-270696 A | 12/2010 |
| JP | 2013-194644 A | 9/2013 |
| JP | 2013-194712 A | 9/2013 |
| JP | 2015-102004 A | 6/2015 |
| WO | 2006/072983 A1 | 7/2006 |

\* cited by examiner

COMBUSTION CHAMBER STRUCTURE FOR DIRECT INJECTION ENGINE

TECHNICAL FIELD

The art disclosed herein relates to a combustion chamber structure for a direct injection engine.

BACKGROUND ART

Patent Document 1 describes a spark-ignition direct-injection engine injecting fuel into a combustion chamber configured as a cavity which is recessed from a top surface of a piston. This direct-injection engine accelerates combustion by adding ozone to intake air which is introduced into a cylinder. As a fuel spray, which is injected through a fuel injection valve arranged at a bore center of the cylinder, distributes in the combustion chamber, flames, which spread from a central portion toward a peripheral portion of the combustion chamber, combust before reaching a wall surface of the cavity. As a result, a gas layer which does not contribute to combustion forms between a combustion gas in the central portion of the combustion chamber (i.e., inside the cavity) and the wall surface of the cavity. This may significantly reduce cooling loss. The direct-injection engine described in Patent Document 1 is further configured to have a high geometric compression ratio of higher than or equal to 15, and significantly improves thermal efficiency in combination with the above-described reduction in cooling loss.

Albeit not disclosing a technique for reducing cooling loss such as that described in Patent Document 1, Patent Document 2 describes how a ceiling portion of a cylinder head is provided with a fuel injection valve at an exhaust side, and with an active species generating device, which generates radicals by non-thermal plasma discharge and which is adjacent to the fuel injection valve at an intake side. The active species generating device generates radicals in an ignition chamber deep inside the combustion chamber. In this engine, gas flow, which accompanies fuel injection from the fuel injection valve adjacent to the active species generating device, is employed to generate negative pressure in the vicinity of an opening of the ignition chamber and to draw the radicals generated in the ignition chamber into the combustion chamber.

Although not disclosing a technique for reducing cooling loss in the same way as that described in Patent Document 2, Patent Document 3 describes how a ceiling portion of a cylinder head is provided with a fuel injection valve at an exhaust side, and with a spark plug adjacent to the fuel injection valve at an intake side. In this engine, a main injection is followed by a second injection in the scope of which the fuel injection valve injects fuel around a discharge gap of the spark plug. By this, a secondary voltage required for the spark plug to produce an electric spark is lowered.

CITATION LIST

Patent Documents

PATENT DOCUMENT 1: Japanese Unexamined Patent Publication No. 2013-194712
PATENT DOCUMENT 2: Japanese Unexamined Patent Publication No. 2010-037948
PATENT DOCUMENT 3: Japanese Unexamined Patent Publication No. 2010-270696

SUMMARY OF THE INVENTION

Technical Problem

As a technique for reducing cooling loss other than that described in Patent Document 1, the applicants of the present application propose a technique (e.g., the technique of Japanese Unexamined Patent Publication No. 2015-102004) in which fuel is injected in a specially designed manner into a combustion chamber in the second half of a compression stroke. As a result, an air-fuel mixture layer forms in a central portion of the combustion chamber, and a heat-insulating gas layer is formed to surround the air-fuel mixture layer. The technique proposed allows an air-fuel mixture to be combusted in such a state. Note that the air-fuel mixture layer as used herein is a layer comprised of, and formed by, a combustible air-fuel mixture. The combustible air-fuel mixture may be defined, for example, as an air-fuel mixture with an equivalence ratio $\varphi$ of higher than or equal to 0.1. Forming the air-fuel mixture layer and the heat-insulating gas layer surrounding the air-fuel mixture layer in the combustion chamber allows for reducing contact between the combustion gas and a wall surface by means of the heat-insulating gas layer. Just like the technique described in Patent Document 1, this technique may significantly reduce the cooling loss.

In the same manner as the technique described in Patent Document 1, the technique proposed in the above-mentioned prior art application also sets the geometric compression ratio of the engine higher than or equal to 15. In order to set the geometric compression ratio high, it is advantageous to minimize a capacity of a cavity provided on a top surface of the piston.

On the other hand, the technique proposed in the prior art application entails the need to prevent the fuel spray injected by the fuel injection valve from coming into contact with the wall surface of the combustion chamber, i.e., with a wall surface of the cavity. Provided that fuel is equally injected from an injection tip of the fuel injection valve at a predetermined spray angle, this configuration is effective inasmuch as the capacity of the cavity is minimized, while the fuel spray is prevented from coming into contact with the wall surface of the cavity. This is achieved by arranging the fuel injection valve such that its valve center axis extends along an axis of the cylinder, by forming the cavity symmetrically with respect to the valve center axis of the fuel injection valve such that the cavity faces the injection tip of the fuel injection valve.

Although not described in Patent Documents 2 and 3, when arranging the fuel injection valve and an ignition electrode—such as a spark plug or an active species generating device—adjacent to each other in the ceiling portion of the cylinder head, it is beneficial if a tip of the ignition electrode is accommodated in a recess recessed from a ceiling surface of the cylinder head. By doing so, fuel, which is injected from the fuel injection valve at a predetermined spray angle for example in a cone shape, is prevented from directly adhering to the tip of the ignition electrode. This improves the reliability of the ignition electrode.

According to examinations made by the present inventors, however, in the case in which the recess recessed from the ceiling surface is provided in the vicinity of the injection tip of the fuel injection valve, fuel spray injected from the injection tip at a predetermined spray angle tends to develop a longer spray distance and is prone to come into contact with the wall surface of the cavity in the region where the recess is formed.

In view of these problems, the technology disclosed herein attempts to lower the risk of fuel spray injected at a predetermined spray angle developing a longer spray distance in a predetermined direction, and coming into contact with a wall surface of a cavity in a direct injection engine in which an air-fuel mixture layer and a heat-insulating gas layer are formed inside a combustion chamber which is the cavity.

Solution to the Problem

First, a mechanism which causes the spray distance of the fuel spray, which is injected from the fuel injection valve at a predetermined spray angle in a predetermined direction, to become longer will be explained in more detail with reference to FIG. 8. FIG. 8 shows a ceiling portion of a cylinder head 13 which defines a combustion chamber 17. In the ceiling portion, a fuel injection valve 6 (e.g., an outwardly-opening fuel injection valve) and an ignition electrode 7 are arranged side by side in the vicinity of a bore center of the cylinder. As long as it is a fuel injection valve which injects fuel at a predetermined spray angle, the fuel injection valve 6 is not limited to the outwardly-opening fuel injection valve. In the example figure, the ignition electrode 7 includes a center electrode and a grounding electrode at a tip of the ignition electrode 7. The ignition electrode 7 is a spark plug which ignites the air-fuel mixture by discharging electricity between the center electrode and the grounding electrode. The ignition electrode 7 is not limited to a spark plug. Although not shown in the drawing, the ignition electrode 7 may as well be a discharge plug a tip of which has an electrode electrically insulated from the cylinder head 13 and protruding into the combustion chamber 17. The discharge plug may generate an ultra-short pulsed electrical discharge (streamer discharge) inside the combustion chamber 17 as a high voltage with a controlled pulse is applied to the electrode. Instead of the spark plug, it is possible to generate ozone inside the combustion chamber 17 by attaching a discharge plug to the engine.

The direction in which the fuel injection valve 6 and the ignition electrode 7 are arranged is not particularly limited. The fuel injection valve 6 and the ignition electrode 7 may be arranged along the engine's output shaft, or may be arranged in a different direction (including an intake/exhaust direction orthogonal to the direction of the engine's output shaft). In the example figure, the fuel injection valve 6 and the ignition electrode 7 are arranged along the engine's output shaft. That is, FIG. 8 is a vertical cross-section of the combustion chamber 17 taken along a plane passing through the injection tip of the fuel injection valve 6 and the tip of the ignition electrode 7. This cross-section corresponds to a vertical cross-section taken along a plane extending along the engine's output shaft. While the valve center axis of the fuel injection valve 6 is arranged along an axis of the cylinder (in a vertical direction in FIG. 8), the tip of the ignition electrode 7 is inclined toward the fuel injection valve 6 relative to the axis of the cylinder.

In order to improve the reliability of the ignition electrode 7, the tip of the ignition electrode 7 (in particular an insulating portion of the tip) is accommodated inside a recess 131 which is recessed from a ceiling surface. Further, in the example drawing, the injection tip of the fuel injection valve 6 is accommodated in a recess 132 which is recessed from the ceiling surface such that the injection tip of the fuel injection valve 6 does not protrude into the combustion chamber 17 and thus is not exposed to an excessively high temperature. As the injection tip of the fuel injection valve 6 and the tip of the ignition electrode 7 are arranged adjacent to each other, the two recesses 131 and 132 partly overlap and are continuous with each other (see the dash-dot-dot lines in FIG. 8).

The fuel injection valve 6 injects fuel from the injection tip at a predetermined spray angle. The outwardly-opening fuel injection valve 6 injects fuel in the form of a hollow cone through the injection tip. The spray flow of the fuel causes a vortex to form around the fuel spray. The vortex raises the fuel spray outwardly upward. As indicated by the arrows in FIG. 8, once returned against a spraying direction of the fuel spray to a spraying base, the vortex joins the fuel spray and thrusts the fuel spray from the spraying base in the spraying direction.

As described above, the recess 131 accommodating the tip of the ignition electrode 7 is provided in the vicinity of the injection tip of the fuel injection valve 6. As a result, when viewing the injection tip as a center, a space surrounding the fuel spray is relatively wide in a region where the recess 131 is formed (corresponding to the region to the right of the injection tip in FIG. 8) and relatively narrow in a region where the recess 131 is not formed (corresponding to the region to the left of the injection tip in FIG. 8). In the region where the space surrounding the fuel spray is relatively narrow, the amount of gas (i.e., air inside the combustion chamber 17) entering the fuel spray due to the vortex is small. Therefore, the fuel spray is not thrust that strongly in the spraying direction by the gas flow. In the region where the space surrounding the fuel spray is relatively wide, however, the amount of gas entering the fuel spray due to the vortex is big. Thus, the fuel spray is thrust strongly in the spraying direction. As a result, it may be concluded that in the region where the space surrounding the fuel spray is relatively wide, a penetration of the fuel spray is stronger and—as indicated by the empty arrow in FIG. 8—the spray distance of the fuel spray is longer than in the region where the space surrounding the fuel spray is relatively narrow. Note that, other than shown in FIG. 8, even in a configuration in which the injection tip of the fuel injection valve 6 is not accommodated in the recess 132, the space surrounding the fuel spray is partially relatively wide and partially relatively narrow as long as the tip of the ignition electrode 7 is accommodated in the recess 131.

Moreover, inside the combustion chamber 17, apart from the gas flow accompanying the injection of fuel, also a squish flow from a peripheral portion toward a central portion of the combustion chamber 17 is generated as the piston approaches a top dead center on a compression stroke. Since this squish flow causes a relatively strong inflow of gas, in the region where the space surrounding the fuel spray is relatively wide, the fuel spray is thrust even more strongly in the spraying direction.

Thus, in the region where the space surrounding the fuel spray is relatively wide, the gas flow (and the squish flow) accompanying the fuel injection causes part of the fuel spray, which is sprayed in the second half the compression stroke, to come into contact with the wall surface of the cavity formed in the top surface of the piston. As a result, in this region no heat-insulating gas layer is formed around the air-fuel mixture layer.

In particular, when a cavity of a small capacity is provided in order to increase the geometric compression ratio, the distance between the injection tip of the fuel injection valve 6 and the wall surface of the cavity becomes relatively small, which increases the risk of the fuel spray coming into contact with the wall surface of the cavity. Moreover, since a squish area increases as the cavity is formed smaller, the squish flow becomes relatively strong and the fuel spray is thrust even more strongly in the spraying direction. As a result, part of the fuel spray becomes more prone to coming into contact with the wall surface of the cavity.

The present inventors have improved the technique disclosed herein by discovering a means to overcome the above-described problem. In general, the wall surface of a cavity has a symmetrical shape with respect to the injection tip of the fuel injection valve. In the technique disclosed herein, however, the wall surface of the cavity corresponding to the region where the space surrounding the fuel spray is relatively wide is provided distal from the injection tip. Thus, the shape of the cavity is strongly asymmetrical with respect to the injection tip of the fuel injection valve. This lowers the risk of the fuel spray coming into contact with the wall surface of the cavity.

Specifically, the technique disclosed herein relates to a combustion chamber structure of a direct injection engine. The combustion chamber structure includes: a piston inserted into a cylinder and having a cavity recessed from a top surface of the piston; a ceiling portion, of a cylinder head, including a ceiling surface which defines the combustion chamber together with an inner peripheral surface of the cylinder and the top surface of the piston; a fuel injection valve having an injection tip, which is arranged on the ceiling portion of the cylinder head such that the injection tip faces an inside of the combustion chamber, and from which fuel is injected at a predetermined spray angle toward the cavity; and an ignition electrode having a tip, which faces the interior of the combustion chamber at the ceiling portion of the cylinder head and which is arranged adjacent to the injection tip of the fuel injection valve.

A recess, which is recessed from the ceiling surface and which accommodates the tip of the ignition electrode, is formed at a location on the ceiling portion of the cylinder head adjacent to the injection tip of the fuel injection valve. A center of the cavity is shifted with respect to a bore center of the cylinder. In a vertical cross-section of the combustion chamber taken along a plane passing through the injection tip of the fuel injection valve and the tip of the ignition electrode, a distance from the injection tip to a wall surface of the cavity at a side at which the ignition electrode is provided is longer than a distance from the injection tip to a wall surface of the cavity at an opposite side, with the injection tip of the fuel injection valve being located between the wall surface at the side at which the ignition electrode is provided and the wall surface at the opposite side.

In this configuration, both the fuel injection valve and the ignition electrode are attached to the ceiling portion of the cylinder head, and the injection tip of the fuel injection valve is arranged in the vicinity of the tip of the ignition electrode. The ignition electrode is a spark plug or a discharge plug. The tip of the ignition electrode is accommodated inside the recess. This lowers the risk of fuel spray, which is sprayed from the fuel injection valve, directly adhering to the tip of the ignition electrode. As a result, the reliability of the ignition electrode can be improved. The recess is provided in the vicinity of the injection tip of the fuel injection valve. As a result, when viewing the injection tip as a center, a space surrounding the fuel spray, which is injected from the injection tip at a predetermined spray angle, is relatively wide in a region where the recess is formed and relatively narrow in a region where the recess is not formed.

In the above configuration, the cavity is formed in the top surface of the piston. The center of the cavity is shifted with respect to the bore center of the cylinder. The combustion chamber is defined by the top surface of the piston, which is provided with the cavity, the inner peripheral surface of the cylinder, and the ceiling surface of the cylinder head. In a vertical cross-section of the combustion chamber taken along a plane passing through the injection tip of the fuel injection valve and the tip of the ignition electrode, a distance from the injection tip to a wall surface of the cavity at a side at which the ignition electrode is provided is longer than a distance from the injection tip to a wall surface of the cavity at an opposite side, with the fuel injection valve being located between the wall surface at the side at which the ignition electrode is provided and the wall surface at the opposite side. In this configuration, the wall surface of the cavity includes a side wall and a bottom wall of the cavity which is recessed from the top surface of the piston. Making the distance from the injection tip to the wall surface longer includes: widening an opening of the cavity by increasing a distance between the side wall of the cavity and the injection tip; deepening the cavity by increasing a distance between the bottom wall of the cavity and the injection tip; and increasing a distance from the injection tip to both the side wall and the bottom wall of the cavity.

In the above-described vertical cross-section, the side at which the ignition electrode is provided with the injection tip between the side and the ignition electrode corresponds to the region where the recess is provided. Thus, the fuel spray is surrounded by a relatively wide space. Consequently, even if the spray distance of the fuel spray is relatively long, this configuration in which the distance between the wall surface of the cavity and the injection tip is increased reduces the risk of the fuel spray coming into contact with the wall surface of the cavity.

On the other hand, in the above-described vertical cross-section, the side which is opposite to the side at which the ignition electrode is provided with the injection tip between this opposite side and the ignition electrode corresponds to the region where the recess is not provided. Thus, the space surrounding the fuel spray is relatively narrow. Consequently, since the spray distance of the fuel spray is relatively short, there is no need to increase the distance between the wall surface of the cavity and the injection tip. Thus, the distance between the wall surface of the cavity and the injection tip is set relatively short. This configuration is beneficial inasmuch as the geometric compression ratio of the combustion chamber is improved as the capacity of the cavity provided on the top surface of the piston is minimized.

On the ceiling portion of the cylinder head, a second recess, which accommodates the injection tip of the fuel injection valve, may be provided recessed from the ceiling surface. The recess accommodating the tip of the ignition electrode and the second recess accommodating the injection tip of the fuel injection valve may partly overlap. When viewing the combustion chamber in plane at a vertical cross-section taken along a plane passing through a predetermined location within an angular range and through the injection tip, in the angular range, which has the injection tip of the fuel injection valve as a vertex and which is defined by lines connecting the injection tip and borders between the recess and the second recess, a distance from the injection tip to a wall surface of the cavity at the predetermined location may be longer than a distance from the injection tip to a wall surface of the cavity at a symmetrical location at an opposite side with respect to the predetermined location, with the injection tip being located between the wall surface at the predetermined location within the angular range and the wall surface at the symmetrical location at the opposite side.

Since the injection tip of the fuel injection valve is accommodated in the second recess, the injection tip does no longer protrude into the combustion chamber, and thus can be prevented from reaching a high temperature.

In such a configuration, in which the recess accommodating the tip of the ignition electrode and the second recess accommodating the injection tip of the fuel injection valve partly overlap each other, when viewing the combustion chamber in plane (i.e., when viewing the combustion chamber from an end of the axis of the cylinder along the axis), within an angular range which has the injection tip of the fuel injection valve as a vertex and which is defined by lines connecting the injection tip and borders between the recess and the second recess, the fuel spray, which is sprayed from the injection tip, is surrounded by a relatively wide space. In this configuration, in a vertical cross-section taken along a plane passing through the predetermined location within the angular range and the injection tip, at least within the angular range, the distance from the injection tip to the wall surface of the cavity at the predetermined location is longer than the distance from the injection tip to the wall surface of the cavity at the symmetrical location at the opposite side with respect to the predetermined location, with the injection tip being located between the wall surface at the predetermined location within the angular range and the wall surface at the symmetrical location at the opposite side. Here, the predetermined location is an arbitrary location within the angular range. By this, in the entire angular range within which the spray distance of the fuel spray may become long, the wall surface of the cavity is distal from the injection tip of the fuel injection valve. This reduces the risk of the fuel spray coming into contact with the wall surface of the cavity.

When viewing the top surface of the piston in plane, an opening edge of the cavity may have the shape of an ellipse with a long axis passing through the injection tip of the fuel injection valve and the tip of the ignition electrode.

The term "elliptical shape" is used herein in a broad sense of the term, including an oblong shape defined by a smooth, continuous curve or a combination of curves and straight lines and having no end, as well as an oval shape forming a locus of points with the sum of the distances from two focal points to each of the points in a plane being constant.

As described above, within the entire angular range defined by the line connecting the injection tip and the recess and the line connecting the injection tip and the second recess, the wall surface of the cavity is distal from the injection tip of the fuel injection valve. As a result, the opening edge of the cavity may be formed in an elliptical shape with the long axis passing through the injection tip of the fuel injection valve and through the tip of the ignition electrode.

The fuel injection valve may be shifted with respect to the bore center of the cylinder. The ignition electrode may be arranged at an opposite side of a side at which the fuel injection valve is arranged, the bore center of the cylinder located between the ignition electrode and the fuel injection valve. The center of the cavity may be shifted toward the side at which the fuel injection valve is arranged with respect to the bore center of the cylinder.

When an air-fuel mixture layer forms in a central portion of the combustion chamber, and a heat-insulating gas layer forms to surround the air-fuel mixture layer, a configuration allowing the injection tip of the fuel injection valve and the center of the cavity to coincide is beneficial inasmuch as—as described above—the fuel spray is kept from coming into contact with the wall surface of the cavity.

By contrast, in the case in which the opening edge of the cavity is formed in the shape of an ellipse with its long axis passing through the injection tip of the fuel injection valve and the tip of the ignition electrode, by increasing the distance of part of the wall surface of the cavity from the injection tip of the fuel injection valve as in the above configuration, the center of the cavity becomes shifted with respect to the injection tip toward the tip of the ignition electrode.

If, in the configuration in which the fuel injection valve and the ignition electrode are arranged at the one side and the other side with the bore center of the cylinder in between, the center of the cavity is shifted from the injection tip of the fuel injection valve toward the tip of the ignition electrode, the center of the cavity becomes close to the bore center of the cylinder. Nevertheless, in the above configuration, the center of the cavity is shifted with respect to the bore center of the cylinder toward the side at which the fuel injection valve is arranged. This means that, even if the distance between the injection tip and the wall surface of the cavity at the side at which the ignition electrode is arranged is increased, since the distance between the wall surface of the cavity and the injection tip is minimized, the capacity of the cavity is set to a minimum. As a result, this configuration is beneficial inasmuch as the geometric compression ratio of the combustion chamber is improved, as described above.

The ceiling portion of the cylinder head may include an intake side inclined surface provided with an opening portion of an intake port and an exhaust side inclined surface provided with an opening portion of an exhaust port, and may define the combustion chamber, which has the shape of a pent-roof. The top surface of the piston may have inclined surfaces on an intake side and an exhaust side, and may be raised by the inclined surfaces to correspond to the intake side inclined surface and the exhaust side inclined surface of the ceiling portion. The injection tip of the fuel injection valve on the ceiling portion of the cylinder head may be arranged on a ridge line of the pent roof at which the intake side inclined surface and the exhaust side inclined surface intersect with each other. The tip of the ignition electrode on the ridge line of the pent roof may be arranged adjacent to the injection tip of the fuel injection valve.

In this configuration, the intake side inclined surface and the exhaust side inclined surface of the ceiling portion of the cylinder head define the combustion chamber which is pent-roof-shaped. To correspond to the ceiling portion, the top surface of the piston is raised by the inclined surfaces on the intake and exhaust sides in the form of a triangular roof, so to speak. By this, the geometric compression ratio of this direct-injection engine is set relatively high. The geometric compression ratio may be for example higher than or equal to 15. By increasing the geometric compression ratio, in the case of compression ignition combustion of the air-fuel mixture inside the combustion chamber, the stability of the engine can be enhanced, while the thermal efficiency of the engine is increased. Note that the ridge line of the pent roof may either coincide or not coincide with the bore center of the cylinder.

Further, in the above configuration, as the piston approaches the compression top dead center, the gas between the ceiling portion, which includes the intake side inclined surface and the exhaust side inclined surface, and the raised top surface of the piston is compressed. This generates a squish flow along the ridge line of the pent roof. On the other hand, since the injection tip of the fuel injection valve and the tip of the ignition electrode are arranged adjacently on the ridge line of the pent roof, the squish flow increases the amount of gas flowing toward a region where the space surrounding the fuel spray is relatively wide (i.e., toward the recess accommodating the tip of the ignition electrode) increases. As a result, the penetration of the fuel spray may also strongly increase.

However, by increasing the distance between the injection tip and the wall surface of the cavity corresponding to the region provided with the recess as described above, the risk of the fuel spray coming into contact with the wall surface of the cavity can be reduced even if the spray distance of the fuel spray increases due to the squish flow.

The fuel injection valve may be arranged such that a valve center axis of the fuel injection valve extends along an axis of the cylinder.

By doing so, the fuel spray is injected from the injection tip of the fuel injection valve provided in the ceiling portion of the cylinder head at a predetermined spray angle into the cavity provided in the top surface of the piston. As a result, the air-fuel mixture layer can form in a center of the combustion chamber (i.e., inside the cavity), and the heat-insulating gas layer can form to surround the air-fuel mixture layer. Note that the configuration in which the valve center axis of the fuel injection valve extends along the axis of the cylinder includes both cases: the case in which the center axis of the fuel spray injected coincides with the valve center axis of the fuel injection valve, and the case in which the center axis of the fuel spray is shifted with respect to the valve center axis of the fuel injection valve.

Alternatively, the fuel injection valve may as well be arranged such that the valve center axis of the fuel injection valve is inclined with respect to the axis of the cylinder in a direction in which the center axis of the fuel spray, which is injected from the injection tip at a predetermined spray angle, becomes closer to the ignition electrode.

In this configuration, the center axis of the fuel spray is inclined toward the tip of the ignition electrode. Therefore, it is possible to narrow the space surrounding the fuel spray also in the region of the recess which accommodates the tip of the ignition electrode. This makes it possible to reduce the above-described increase of the penetration in a predetermined region of the fuel spray due the gas flow and squish flow which accompany the fuel injection. That is, the spray distance of the fuel spray is kept from becoming long. Therefore, since it is possible to minimize the distance between the wall surface of the cavity and the injection tip, the capacity of the cavity can be set to a minimum. That is, the configuration in which the valve center axis of the fuel injection valve is inclined is beneficial inasmuch as the geometric compression ratio of the direct injection engine is enhanced. Note that also the configuration in which the valve center axis of the fuel injection valve is inclined with respect to the axis of the cylinder includes both cases: the case in which the center axis of the fuel spray injected coincides with the valve center axis of the fuel injection valve, and the case in which the center axis of the fuel spray is shifted with respect to the valve center axis of the fuel injection valve.

Furthermore, as described above, just like in the configuration in which the valve center axis of the fuel injection valve is inclined with respect to the axis of the cylinder, in the configuration in which the valve center axis of the fuel injection valve extends in the direction of the axis of the cylinder, it is possible to keep the spray distance of the fuel spray from becoming long if the center axis of the fuel spray is set to be inclined with respect to the valve center axis of the fuel injection valve.

Advantages of the Invention

According to the above structure for a combustion chamber of a direct injection engine, in a vertical cross-section of the combustion chamber structure taken along a plane passing through the injection tip of the fuel injection valve and the tip of the ignition electrode, the distance from the injection tip to a wall surface of the cavity at a side at which the ignition electrode is provided is configured to be longer than a distance from the injection tip to the wall surface of the cavity at an opposite side, with the injection tip being between the side and the opposite side. By doing so, even if the spray distance of the fuel spray becomes longer in the respective region, the fuel spray can be kept from coming into contact with the wall surface of the cavity, and cooling loss can be reduced.

DESCRIPTION OF EMBODIMENTS

Embodiments will now be described with reference to the drawings. Note that the following description is an example.

(Entire Configuration for Engine)

Figure 1:
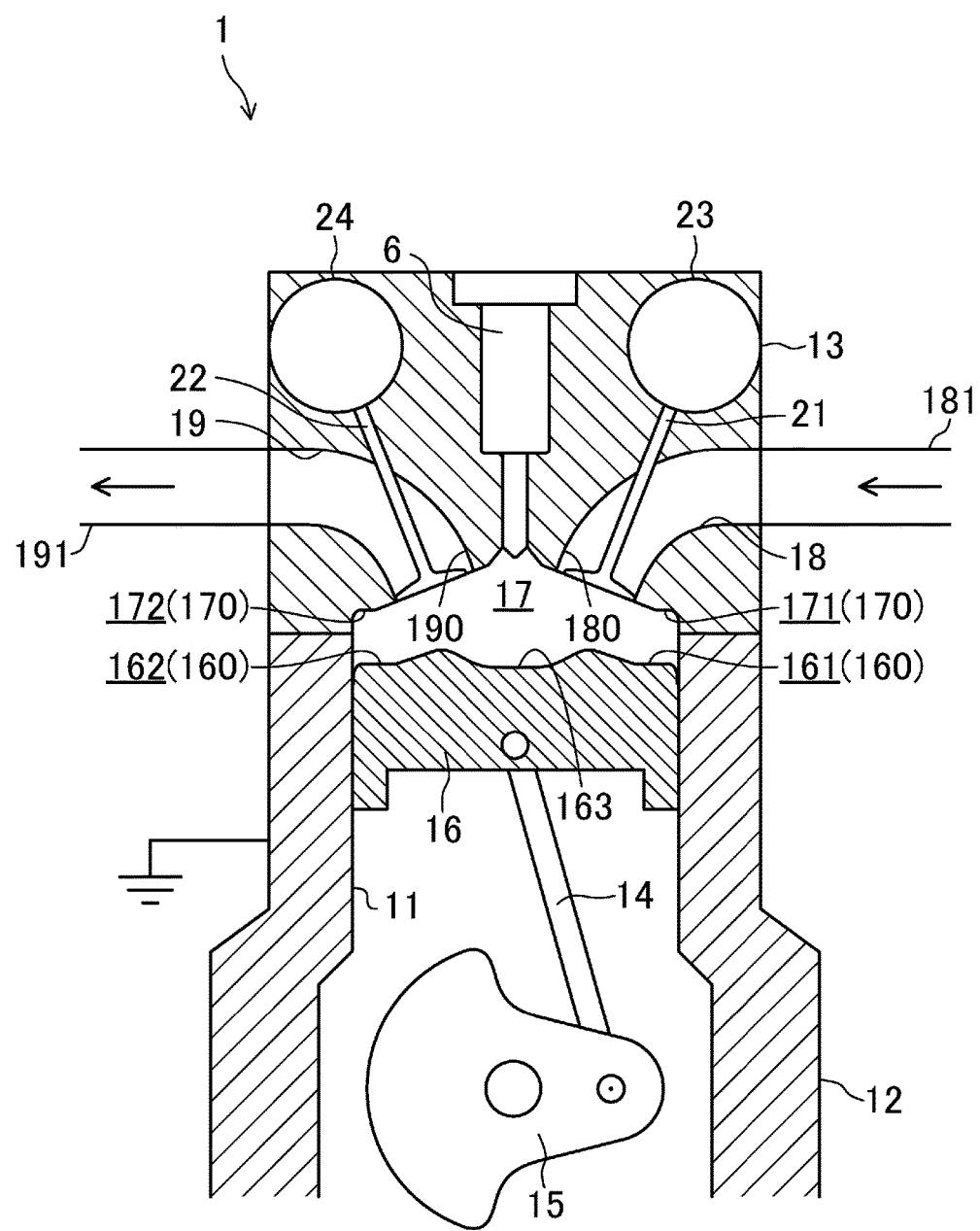
FIG. 1 is a schematic view illustrating a configuration of an engine.

FIG. 1 illustrates a configuration for an engine 1 according to an embodiment. Although not shown, a crankshaft 15 of the engine 1 is coupled to driving wheels through a transmission. Transmitting the output of the engine 1 to the driving wheels propels a vehicle. In this embodiment, fuel for the engine 1 is gasoline. However, the fuel may also be, for example, gasoline containing bioethanol, and may be any fuel as long as it is a liquid fuel containing at least gasoline.

The engine 1 includes a cylinder block 12, and a cylinder head 13 mounted on the cylinder block 12. A plurality of cylinders 11 is formed inside the cylinder block 12 (only one of these cylinders is illustrated in FIG. 1). The engine 1 is a multi-cylinder engine. Although not shown, a water jacket, in which cooling water runs, is formed inside the cylinder block 12 and the cylinder head 13. A piston 16, which is coupled to the crankshaft 15 through a connecting rod 14, is slidably fitted into each of the cylinders 11. The piston 16 defines a combustion chamber 17 along with the cylinder 11 and the cylinder head 13.

In this embodiment, a ceiling portion 170 of the combustion chamber 17 (a lower surface of the cylinder head 13)

has an intake side inclined surface 171 and an exhaust side inclined surface 172, which are inclined upward toward a center of the cylinder 11. The intake side inclined surface 171 is provided with an opening 180 of an intake port 18. The exhaust side inclined surface 172 is provided with an opening 190 of an exhaust port 19. The combustion chamber 17 is a pent-roof-shaped combustion chamber. Note that a ridge line of the pent roof may either coincide or not coincide with a bore center of the cylinder 11. In this embodiment, the ridge line of the pent roof coincides with the bore center of the cylinder 11. Consequently, in FIG. 4, which is a plan view of a top surface 160 of the piston 16, the dash-dot line extending in a lateral direction in the drawing corresponds to the ridge line of the pent roof. The top surface 160 of the piston 16 has inclined surfaces 161 and 162, which are inclined upward toward the center of the piston 16 on the intake and exhaust sides respectively, to correspond to the intake side inclined surface 171 and the exhaust side inclined surface 172 of the ceiling portion 170. The top surface 160 is raised such that the inclined surfaces 161 and 162 form a triangular roof. Thus, the geometric compression ratio of the engine 1 is set high, i.e., equal to or higher than 15. The top surface 160 of the piston 16 has a recessed cavity 163. The shape of the top surface 160 of the piston 16 will be described below in detail.

Although only one of the intake ports is illustrated in FIG. 1, actually two intake ports 18 are provided for the cylinder head 13 of each cylinder 11. The intake side inclined surface 171 of the cylinder head 13 is provided with the openings 180 of the two intake ports 18, which are arranged side by side along the engine's output shaft (i.e., along the crankshaft 15). The intake ports 18 communicate with the combustion chamber 17 through the respective opening 180. The openings 180 of the two intake ports 18 are arranged symmetrically with respect to the bore center of the cylinder 11, while axes of throat portions of the intake ports 18 are defined symmetrically with respect to the bore center of the cylinder 11. Likewise, two exhaust ports 19 are provided for the cylinder head 13 of each cylinder 11. The exhaust side inclined surface 172 of the cylinder head 13 is provided with the openings 190 of the exhaust ports 19, which are arranged side by side along the engine's output shaft. The exhaust ports 19 communicate with the combustion chamber 17 through the respective openings 190. The openings 190 of the two exhaust ports 19 are arranged symmetrically with respect to the bore center of the cylinder 11.

The intake ports 18 are each connected to an intake passage 181. Although not shown, a throttle valve which controls the flow rate of intake air is arranged in the intake passage 181. The exhaust ports 19 are each connected to an exhaust passage 191. Although not shown, the exhaust passage 191 is provided with an exhaust gas purifying system having one or more catalyst converters. The catalyst converter includes a three-way catalyst.

The cylinder head 13 is provided with an intake valve 21 and an exhaust valve 22, which respectively block (shut off) the intake port 18 and the exhaust port 19 from the combustion chamber 17. The intake valve 21 is driven by an intake valve drive mechanism. The exhaust valve 22 is driven by an exhaust valve drive mechanism. The intake valve 21 and the exhaust valve 22 reciprocate at a predetermined timing to open and close the intake port 18 and the exhaust port 19 respectively and to exchange gas inside the cylinder 11. Although not shown, the intake valve drive mechanism and the exhaust valve drive mechanism respectively include an intake camshaft and an exhaust camshaft each of which is drive-connected to the crankshaft 15. The camshafts rotate synchronously with the crankshaft 15. In this example, the intake valve drive mechanism and the exhaust valve drive mechanism include at least hydraulic or electric variable valve timing (VVT) mechanisms 23 and 24 capable of continuously changing the phase of the intake camshaft within a predetermined angular range. The intake valve drive mechanism and/or the exhaust valve drive mechanism may include, in addition to the VVT mechanisms 23 and 24, variable valve lift mechanisms capable of changing a valve lift amount. The variable valve lift mechanisms may be continuous variable valve lift (CVVL) mechanisms capable of continuously changing the valve lift amount. The valve drive mechanisms driving the intake valve 21 and the exhaust valve 22 may be of any type. Examples of adoptable valve drive mechanisms include hydraulic and electromagnetic drive mechanisms.

Figure 2:
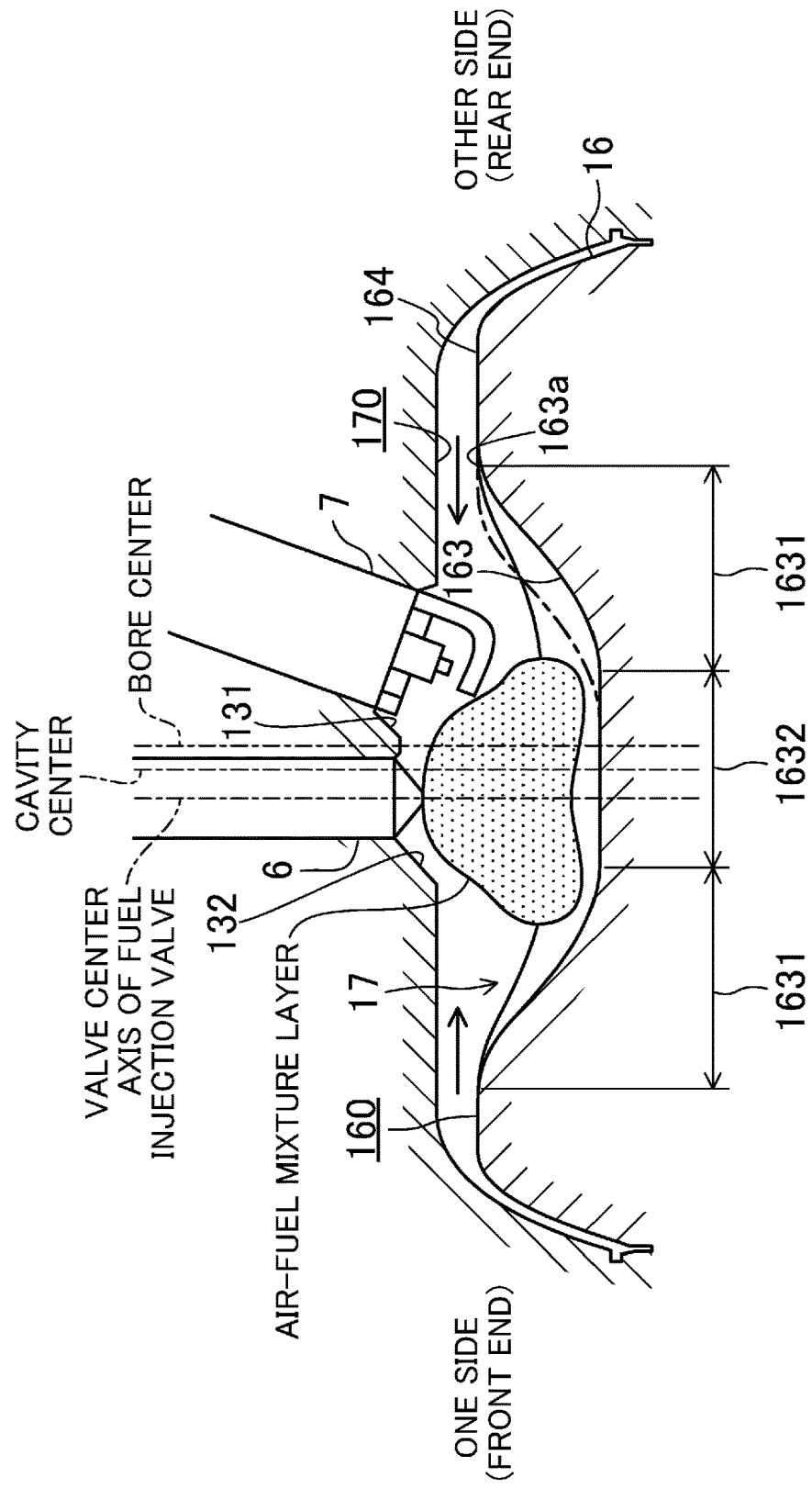
FIG. 2 is a vertical cross-sectional view illustrating a configuration of a combustion chamber.

A fuel injection valve 6 which directly injects fuel into the combustion chamber 17 is attached to the cylinder head 13. The fuel injection valve 6 is arranged on the ridge line of the pent roof at which the intake side inclined surface 171 and the exhaust side inclined surface 172 intersect with each other. As shown in FIG. 2, the fuel injection valve 6 is shifted toward one side of the engine's output shaft (on the left in FIG. 2; in this embodiment this side corresponds to a so-called "front side" of the engine, i.e., the side of the engine 1 opposite to the transmission) with respect to the bore center of the cylinder 11. Further, the fuel injection valve 6 has an valve center axis extending along the axis of the cylinder 11, and an injection tip facing an interior of the combustion chamber 17. The cavity 163 of the piston 16 is provided to face the fuel injection valve 6. The fuel injection valve 6 injects fuel into the cavity 163.

The fuel injection valve 6 is configured such that an air-fuel mixture layer (combustible) and a heat-insulating gas layer surrounding the air-fuel mixture layer may be formed in the combustion chamber 17 (i.e., in the cavity 163), as conceptually shown in FIG. 2. The fuel injection valve 6 may be, for example, an outwardly-opening fuel injection valve which injects fuel at a predetermined spray angle. The outwardly-opening fuel injection valve may adjust a valve lift amount to change a particle size of a fuel spray to be injected. As disclosed in Japanese Patent Application No. 2013-242597 prior filed by the applicants, the characteristics of the outwardly-opening fuel injection valve 6 may be taken advantage of to appropriately control a mode of a fuel injection which is basically a multi-stage injection. By this, a spray distance of the fuel spray in the traveling direction thereof and spread of the fuel spray with respect to a center axis thereof may be adjusted. Thus, if fuel is injected at a timing when the piston is close to the compression top dead center, the air-fuel mixture layer may be formed in a central portion of the cavity 163, and a heat-insulating gas layer may be formed to surround the air-fuel mixture layer. If not only the outwardly-opening fuel injection valve but also a valve covered orifice (VCO) nozzle type fuel injection valve adjust the degree of cavitation occurring at a nozzle port, the particle size of the fuel spray to be injected may be changed by changing an effective cross-sectional area of a nozzle hole. Consequently, if—just like the outwardly-opening fuel injection valve—the VCO nozzle type fuel injection valve adjusts the spray distance of the fuel spray in the traveling direction thereof and the spread of the fuel spray with respect to a center axis thereof at a timing when the piston is close to the compression top dead center, the air-fuel mixture layer may be formed in the central portion of the cavity 163, and the heat-insulating gas layer may be formed to surround the air-fuel mixture layer.

In addition, the fuel injection valve 6 may be configured as a multi-hole fuel injection valve provided with a plurality of injection holes at the injection tip and injecting fuel at a predetermined spray angle, or as a swirl injector, which injects fuel in the form of a hollow cone.

Figure 4:
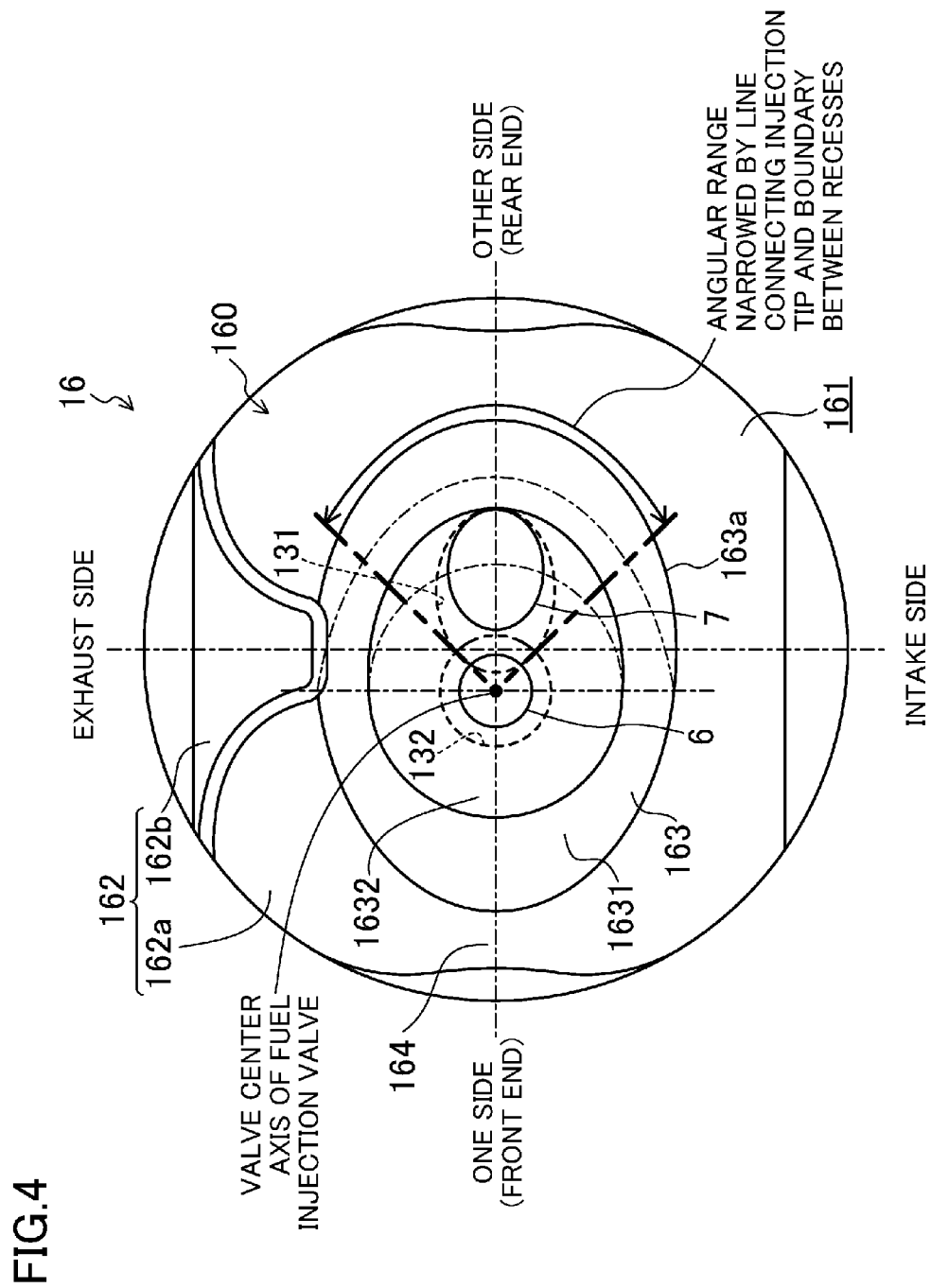
FIG. 4 is a flat explanatory diagram illustrating the shape of the top surface of the piston.
Figure 8:
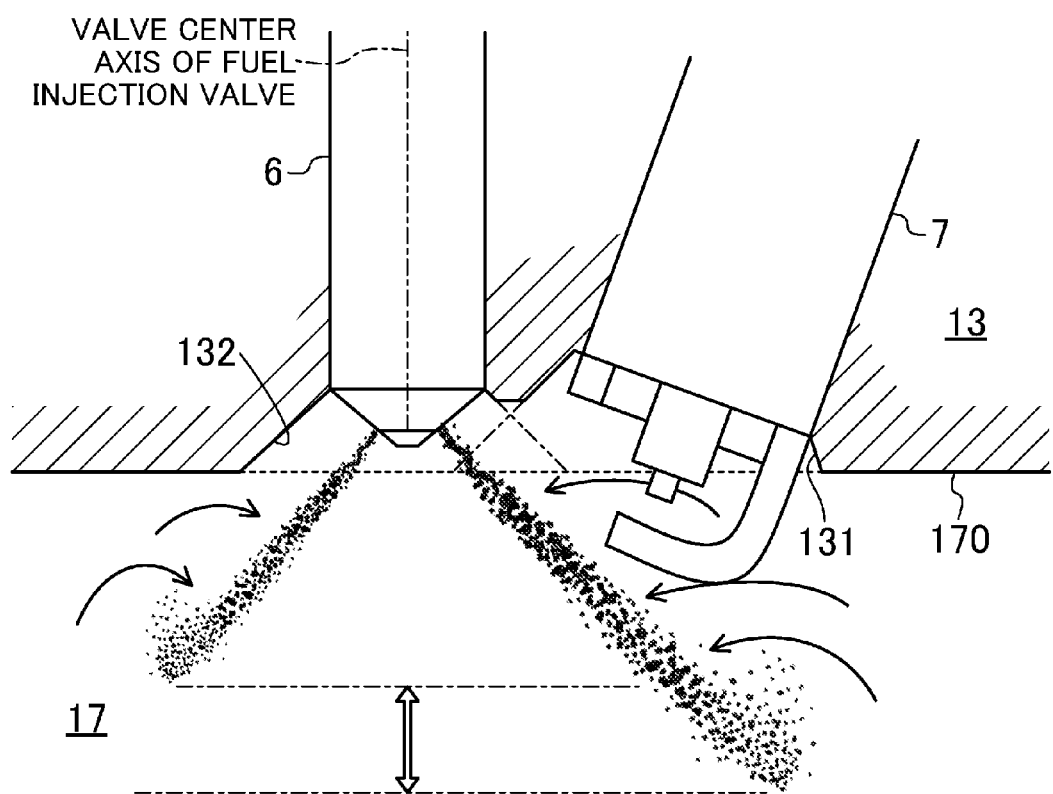
FIG. 8 is an enlarged vertical cross-sectional view illustrating a ceiling portion of a combustion chamber.

As shown at an enlarged scale in FIGS. 2 and 8, the injection tip of the fuel injection valve 6 is accommodated in a recess 132 which is recessed from a ceiling surface of the cylinder head 13. By this, the injection tip does no longer protrude into the combustion chamber 17, and can be prevented from reaching a high temperature. As shown in FIG. 4 by dashed lines and dash-dot lines, the recess 132 has a round shape corresponding to the round cross-section of the injection tip. Note that the dashed lines and dash-dot lines in FIG. 4 indicate an opening edge of the recess 132 in the ceiling portion 170 of the cylinder head 13. As described later, parts of the opening edge indicated by the dash-dot lines do not exist in reality. Further, as shown in FIG. 8, the recess 132 has a diameter which gradually increases from the injection tip of the fuel injection valve 6 toward the ceiling surface of the cylinder head 13. By this, the fuel spray, which is sprayed from the injection tip in the form of a hollow cone, the diameter of which gradually increases from the injection tip downward along an axis of the cylinder 11, and is kept from coming into contact with a peripheral surface of the recess 132.

A spark plug 7, which serves as an ignition electrode, is fitted into the cylinder head 13. As shown in FIG. 2, the spark plug 7 is arranged on the ridge line of the pent roof so as to be shifted, with respect to the bore center of the cylinder 11, toward the other side of the engine's output shaft (i.e., toward the rear side of the engine). The spark plug 7 has a tip which is inclined toward the fuel injection valve 6 relative to the axis of the cylinder 11. The spark plug 7 is inclined on the ridge line of the pent roof. Thus, the injection tip the fuel injection valve 6 and the tip of the spark plug 7 are arranged close to each other along the ridge line of the pent roof in the vicinity of the bore center of the cylinder 11. Note that instead of the spark plug 7, a discharge plug which generates ozone inside the combustion chamber 17 may be fitted into the cylinder head 13 to serve as an ignition electrode.

The tip of the spark plug 7 is accommodated in a recess 131 which is recessed from the ceiling surface of the cylinder head 13. As shown in FIGS. 2 and 4, the recess 131, which accommodates the tip of the spark plug 7—in particular an insulating portion of the spark plug 7—has a round shape corresponding to the round cross-section of the tip. The recess 131 has a diameter which increases from the tip of the spark plug 7 toward the ceiling surface of the cylinder head 13. Note that, corresponding to the spark plug 7 inclined relative to the axis of the cylinder 11, the recess 131 accommodating the tip of the spark plug 7 is also inclined relative to the axis of the cylinder 11. Therefore, the dashed lines and dash-dot lines in FIG. 4 indicate an opening edge of the recess 131 in the ceiling portion 170 of the cylinder head 13. In planar view, this opening edge is an ellipse.

As the injection tip of the fuel injection valve 6 and the tip of the spark plug 7 are arranged close to each other, the recesses 131 and 132 accommodating these tips partly overlap such that the recesses 131 and 132 are continuous with each other. Consequently, in FIG. 4, the parts of the opening edge of the recess 131—and of the recess 132, as described above—indicated by the dash-dot lines do not exist in reality (also see FIG. 8).

As described above, the engine 1 has a geometric compression ratio set higher than or equal to 15. The geometric compression ratio may be lower than or equal to 40, and is suitably higher than or equal to 20 and lower than or equal to 35. The higher a compression ratio of the engine 1 becomes, the more an expansion ratio of the engine 1 increases. Thus, the engine 1 has a high compression ratio and a relatively high expansion ratio at the same time. The engine 1 is basically configured to combust the fuel injected into the cylinder 11 in an entire operation range by compression ignition. The high geometric compression ratio stabilizes the compression ignition combustion.

The combustion chamber 17 is defined by the inner peripheral surface of the cylinder 11, the top surface 160 of the piston 16, the lower surface of the cylinder head 13 (the ceiling portion 170), and the valve head surfaces of the intake valve 21 and the exhaust valve 22. Heat shield layers are respectively provided at these defining surfaces to cut down cooling loss. This insulates the combustion chamber 17 from heat. The heat shield layers may be provided on all or only some of the defining surfaces. Moreover, the heat shield layers may also be provided on wall surfaces of the intake ports 18 and the exhaust ports 19 near the openings at the ceiling portion 170 of the combustion chamber 17, albeit these wall surfaces do not directly define the combustion chamber 17.

In order to substantially keep the heat of the combustion gas in the combustion chamber 17 from being dissipated through the defining surfaces, these heat shield layers are designed to have a lower thermal conductivity than metal base members forming the combustion chamber 17.

Further, in order to reduce the cooling loss, the heat shield layers beneficially have lower volumetric specific heat than the base members. Specifically, it is recommended that the thermal capacity of the heat shield layers be reduced so that the temperature of the defining surfaces of the combustion chamber 17 varies in accordance with changes in the gas temperature inside the combustion chamber 17.

The heat shield layers may be formed, for example, by coating the base members with a ceramic material, such as $ZrO_2$, by plasma spray coating. The ceramic material may have a large number of pores. This may further reduce the thermal conductivity and volumetric specific heat of the heat shield layers.

In this embodiment, in addition to the above-described heat shield structure in the combustion chamber 17, heat-insulating layers (i.e., gas layers) formed in the combustion chamber 17 significantly reduce the cooling loss.

Specifically, fuel is injected through the injection tip of the fuel injection valve 6 into the cavity 163 during and after the compression stroke such that a gas layer including fresh air is formed in a peripheral portion of the combustion chamber 17 and an air-fuel mixture layer is formed in a central portion of the combustion chamber 17. By this, as shown in FIG. 2, the air-fuel mixture layer is formed in the central portion of the cavity 163 near the fuel injection valve 6, and the gas layer containing fresh air is formed to surround the air-fuel mixture layer. The gas layer may consist essentially of fresh air, or may contain some burned gas (EGR gas) in addition to fresh air. A small amount of fuel can be mixed into the gas layer without causing any problems. In order to function as a heat-insulating layer, the gas layer merely needs to be fuel-leaner than the air-fuel mixture layer.

If fuel is burned by compression ignition with the gas layer and the air-fuel mixture layer formed as described above, the gas layer between the air-fuel mixture layer and the wall surface of the combustion chamber 17 prevents the flames of the air-fuel mixture layer from reaching the wall surface of the combustion chamber 17. The gas layer serves as a heat-insulating layer, and hence prevents heat from being dissipated from the wall surfaces of the combustion chamber 17. As a result, the cooling loss decreases significantly.

Merely reducing the cooling loss does not greatly contribute to enhancement in the indicated thermal efficiency, since the reduced cooling loss is converted to the exhaust loss. However, due to an increase in the expansion ratio accompanying an increase in the compression ratio, the engine 1 efficiently converts the energy of the combustion gas corresponding to the reduced cooling loss into mechanical work. That is, the engine 1 significantly enhances the thermal efficiency indicated by employing a structure which reduces both the cooling loss and the exhaust loss.

To form such an air-fuel mixture layer and such a gas layer in the combustion chamber 17, the gas flow intensity in the combustion chamber 17 is beneficially low when the fuel is injected. Thus, the intake ports have a straight shape which prevents a vortex from forming, or makes it difficult for a vortex to form, in the combustion chamber 17, and is designed to minimize the intensity of a tumble flow.

Figure 3:
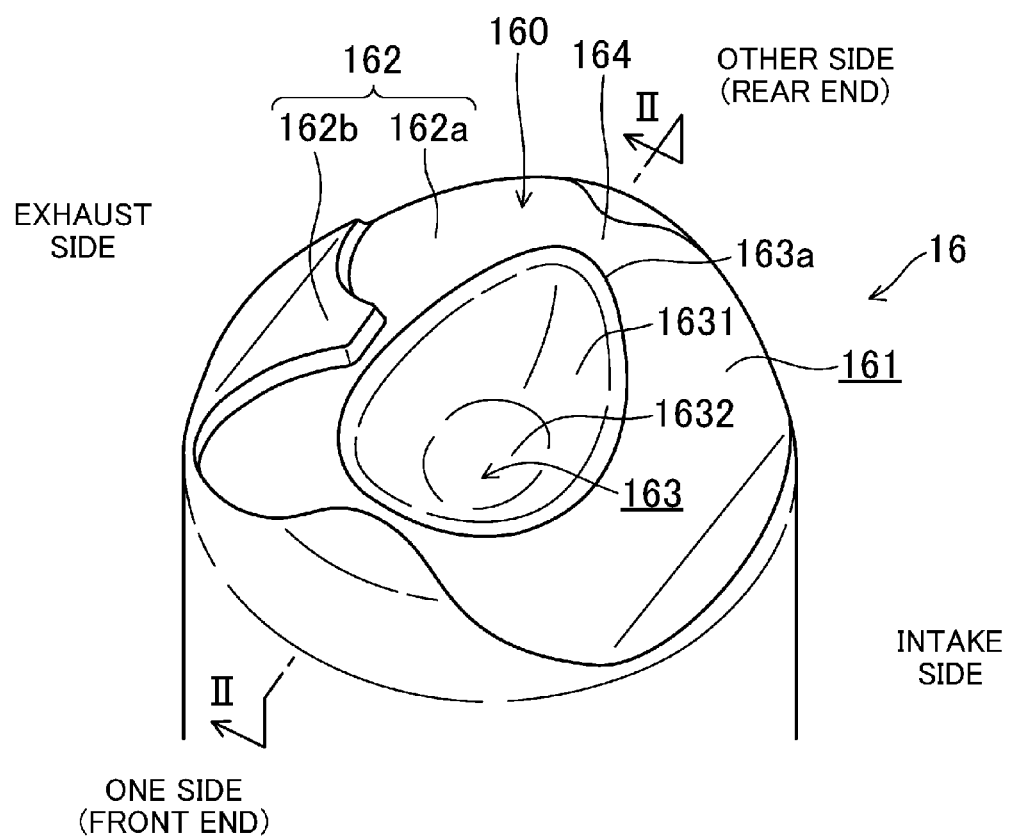
FIG. 3 is a perspective view illustrating the shape of a top surface of a piston.

Next, the configuration of the combustion chamber 17 will be described in more detail with reference to the drawings. FIG. 3 is a perspective view illustrating the shape of the top surface 160 of the piston 16. In FIG. 3, the front right side is an intake side, the back left side is an exhaust side, the front left side is one side of the engine's output shaft (i.e., the front side of the engine), and the back right side is the other side of the engine's output shaft (i.e., the rear side of the engine).

As described above, the top surface 160 of the piston 16 has the intake side inclined surface 161 and the exhaust side inclined surface 162, which are inclined upward toward the center of the piston 16. Thus, when the piston 16 is viewed from the one side of the engine's output shaft along the engine's output shaft, the top surface of the piston 16 forms the shape of a triangular roof, which is gradually raised from each of its lateral sides toward its central portion. The intake side inclined surface 161 and the exhaust side inclined surface 162 each have a valve recess. Among these surfaces, the intake side inclined surface 161 has a portion which faces a region between valve heads of the two intake valves 21 arranged side by side along the engine's output shaft and which is hollowed out along with the valve recess. The intake side inclined surface 161 has the valve recess but forms a substantially flat surface. On the other hand, the exhaust side inclined surface 162 has a portion which faces a region between valve heads of the two intake valves 22 arranged side by side along the engine's output shaft and which is not hollowed out. This portion functions as a squish area 162b where a squish flow from the exhaust side toward the center of the combustion chamber 17 is generated when the piston 16 reaches a point near its top dead center. Consequently, a valve recess 162a and the squish area 162b form the exhaust side inclined surface 162.

The top surface 160 of the piston 16 has a ridge 164 which connects the intake side inclined surface 161 and the exhaust side inclined surface 162 with each other. The ridge 164 faces the ridge line of the pent roof in the ceiling portion 170 of the cylinder head 13. As also shown in FIG. 2, both lateral end portions of the piston 16, which are located along the engine's output shaft in the vicinity of the ridge 164, are curved such that the diameter of the piston 16 decreases toward the top surface 160. This curved shape corresponds to the curved shape of the ceiling portion 170 of the cylinder head 13. This effectively helps increase the geometric compression ratio of the engine 1.

As shown by the arrows in FIG. 2, when the piston 16 reaches a point near its top dead center, the ridge 164 of the piston 16 functions as a squish area where two squish flows are generated. The two squish flows flow along the ridge line of the pent roof in the direction of the engine's output shaft toward the center of the combustion chamber 17, one from the one side and the other one from the other side.

As described above, the top surface 160 of the piston 16 has the recessed cavity 163. As shown in FIG. 2, the diameter of the cavity 163 gradually decreases from an opening edge 163a toward a bottom. The cavity 163 has a side wall 1631 continuous with the top surface 160 of the piston 16, and a bottom wall 1632 continuous with the side wall 1631. As shown in FIG. 2, when viewed in a vertical cross-section through the center of the piston 16, the cavity 163 has a bathtub-like shape. The side wall 1631 has a different angle than the top surface 160 of the piston 16 and the bottom wall 1632. Portions of the piston 16 between the top surface 160 and the side wall 1631 and between the side wall 1631 and the bottom wall 1632 are both rounded portions.

In the following description, the rounded portion between the top surface 160 and the side wall 1631 of the piston 16 is assumed to be included in the side wall 1631 of the cavity, and a region where the top surface 160 and the rounded portion are in contact with each other is defined as a boundary between the top surface 160 and the side wall 1631. This boundary constitutes the opening edge 163a of the cavity 163. Moreover, the rounded portion between the side wall 1631 and the bottom wall 1632 is included in the side wall 1631, and the region where the rounded portion and the bottom wall 1632 are in contact with each other is defined as a boundary between the side wall 1631 and the bottom wall 1632. Note that the boundary between the top surface 160 and the side wall 1631 and the boundary between the side wall 1631 and the bottom wall 1632 may also be each defined differently than described before. For example, the rounded portion between the top surface 160 and the side wall 1631 may be included in the top surface 160, and the region where the rounded portion and the side wall 1631 are in contact with each other may be defined as the boundary between the top surface 160 and the side wall 1631. Further, a center of the rounded portion may also be defined as the boundary between the top surface 160 and the side wall 1631. Likewise, the rounded portion between the side wall 1631 and the bottom wall 1632 may also be included in the bottom wall 1632, and the region where the rounded portion and the side wall 1631 are in contact with each other may be defined as the boundary between the side wall 1631 and the bottom wall 1632. Alternatively, a center of the rounded portion may also be defined as the boundary between the side wall 1631 and the bottom wall 1632. All features of the shape of the cavity in the following description may hold true, irrespective of how the top surface 160, the side wall 1631, and the bottom wall 1632 are defined.

As shown in FIGS. 3 and 4, the cavity 163 has a substantially elliptic opening edge 163a. The term "elliptic shape" is used in a broad sense of the term.

Basically, the cavity 163 provided on the top surface of the piston 16 has a center axially aligned with the fuel injection valve 6. This is beneficial inasmuch as, even if the capacity of the cavity 163 is reduced, the distance from the injection tip of the fuel injection valve 6 to the wall surface of the cavity 163 remains regular, the fuel spray—if evenly sprayed from the injection tip—is prevented from coming into contact with the wall surface of the cavity 163, and the heat-insulating gas layer is formed to surround the air-fuel mixture layer in a central portion of the cavity 163. Since, however, the recess 131, which accommodates the tip of the spark plug 7, is formed adjacent to the injection tip of the fuel injection valve 6, the fuel spray, which is injected through the injection tip in the form of a hollow cone, does not spread evenly. As a result, in a region where the recess 131 is formed, the spray distance of the fuel spray becomes relatively long. That is, as explained with reference to FIG. 8, due the gas flow and the squish flow at the ridge 164 accompanying the fuel injection, the amount of gas joining the fuel spray increases in a region where the space surrounding the fuel spray is relatively wide. This gas strongly thrusts the fuel spray in the spraying direction such that a penetration of the fuel spray becomes stronger and the spray distance becomes longer.

Therefore, corresponding to the uneven spread of the fuel spray, in the engine 1, the wall surface of the cavity 163 is formed asymmetrically with respect to the injection tip of the fuel injection valve 6.

Specifically, as shown in FIG. 4, the cavity 163 has the shape of an ellipse, the long axis of which connects the injection tip of the fuel injection valve 6 and the tip of the spark plug 7. In the intake/exhaust direction (i.e., the vertical direction in FIG. 4) which is orthogonal to the direction of the engine's output shaft, the cavity 163 is symmetric with respect to a line passing through the bore center of the cylinder 11. Thus, the long axis of the elliptic cavity 163 coincides with the ridge line of the pent roof of the cylinder head 13, and both the valve center axis of the fuel injection valve 6 and the center of the spark plug 7 are located on the long axis of the elliptic cavity 163.

On the other hand, in the direction of the engine's output shaft (i.e., the lateral direction in FIG. 4), the center of the elliptic cavity 163 is shifted with respect to the bore center of the cylinder 11.

More specifically, as shown in FIG. 2, in a vertical cross-section taken along a plane passing through the injection tip of the fuel injection valve 6 and the tip of the spark plug 7, a distance from the injection tip to a wall surface of the cavity 163 at a side at which the spark plug 7 is provided (i.e., the wall surface on the right side in FIG. 2) is longer than a distance from the injection tip to a wall surface of the cavity 163 at an opposite side (i.e., the wall surface on the left side in FIG. 2), with the fuel injection valve 6 between the wall surface at the side at which the spark plug 7 is provided and the wall surface at the opposite side.

The dash-dot lines in FIGS. 2 and 4 indicate a hypothetical case in which the wall surface of the cavity at an other side in the direction of the engine's output shaft is formed symmetrically to the wall surface of the cavity at one side in the direction of the engine's output shaft, with the fuel injection valve 6 between the wall surfaces at the one side and at the other side. In this case, as shown by the solid and the dash-dot lines in FIG. 4, the bottom wall 1632 of the cavity 163 has a substantially round shape in planar view, while the opening edge 163*a* of the cavity 163 has the shape of an ellipse (or oval), which has the valve center axis of the fuel injection valve 6 at its center and is symmetric in the direction of the engine's output shaft. Further, as shown in FIG. 2, the distance from the injection tip to the side wall 1631 and the bottom wall 1632 of the cavity 163 at the one side (solid line) in the direction of the engine's output shaft is the same as that at the other side (dash-dot line) in the direction of the engine's output shaft, with the valve center axis of the fuel injection valve 6 in between.

In the present configuration, by contrast, the wall surface of the cavity 163 at the other side in the direction of the engine's output shaft is relatively distal from the injection tip, as shown by the solid line in FIG. 2. Specifically, the bottom wall 1632 of the cavity 163 is widened toward the other side in the direction of the engine's output shaft without altering the depth of the cavity 163, while the side wall 1631 of the cavity 163 is shifted toward the other side in the direction of the engine's output shaft. Consequently, as shown by the solid line in FIG. 4, the bottom wall 1632 of the cavity 163 has the shape of an ellipse in planar view, while the opening edge 163*a* of the cavity 163 has the shape of an ellipse extending toward the other side in the direction of the engine's output shaft. As a result, as shown in FIG. 2, the center of the cavity 163 in the direction of the engine's output shaft is shifted further toward the other side in the direction of the engine's output shaft than the valve center axis of the fuel injection valve 6.

By shifting the side wall 1631 of the cavity 163 further toward the other side in the direction of the engine's output shaft than indicated by the dash-dot line, the distance between the injection tip and the wall surface of the cavity 163 is relatively long in the region where the recess 131 is formed. Thus, even if the spray distance of the fuel spray increases around the fuel spray, the risk of the fuel spray coming into contact with the wall surface of the cavity 163 can be reduced.

Thus, it is conceivable to shift the side wall 1631 of the cavity 163 far toward the other side in the direction of the engine's output shaft in order to prevent the fuel spray from coming into contact with the wall surface of the cavity 163. In such a case, however, the opening of the cavity 163 would increase in size, which would increase the capacity of the cavity 163. This would be disadvantageous for the present engine, which has an enhanced geometric compression ratio. Therefore it is beneficial to shift the side wall 1631 of the cavity 163 as little as possible. In the example shown in FIGS. 2 and 4, the side wall 1631 of the cavity 163 is shifted toward the other side in the direction of the engine's output shaft to the least possible extent. As described above, even if the center of the cavity 163 with respect to the direction of the engine's output shaft is shifted further toward the other side in the direction of the engine's output shaft than the valve center axis of the fuel injection valve 6, the center of the cavity 163 is still shifted toward the one side in the direction of the engine's output shaft with respect to the bore center of the cylinder 11.

Further, in the example shown in FIG. 4, the wall surface of the cavity 163 spreads over the entire area of the other side, with the fuel injection valve 6 in between, in the direction of the engine's output shaft. That is, the wall surface of the cavity 163 is spread over approximately half of the elliptic cavity 163. By this, the fuel spray can be reliably prevented from coming into contact with the wall surface of the cavity 163 over an even wider area.

As shown in FIG. 4, since the spray distance of the fuel spray is long in a region around the fuel spray where the recess 131 of the spark plug 7 is provided, it is beneficial to widen the wall surface of the cavity 163 toward the other side in the direction of the engine's output shaft at least in an angular range defined by lines connecting the injection tip of the fuel injection valve 6 and borders between the two recesses 131 and 132 (i.e., when viewing the combustion chamber 17 in plane, the borders correspond to two points where the ellipse indicating the opening edge of the recess 131 and the circle indicating the opening edge of the recess 132 intersect with each other). Within this angular range, it is beneficial if in a central portion (a portion distal from border lines of the angular range and corresponding to a ridge line of the pent roof) the wall surface of the cavity 163 is as distal from the injection tip as possible. Also at side portions of the angular range (portions close to the border lines of the angular range), it is beneficial if the wall surface of the cavity 163 is sufficiently distal from the injection tip. By this, the fuel spray can be effectively kept from coming into contact with the wall surface of the cavity 163. On the other hand, if the angular range within which the wall surface of the cavity 163 extends toward the other side in the direction of the engine's output shaft is set as narrow as possible, it is possible to minimize the capacity of the cavity 163, which is beneficial inasmuch as the geometric compression ratio of the engine 1 is enhanced.

As shown in FIG. 4, when viewing the top surface of the piston 16 in plane, it is beneficial to set the ratio of the area of the ellipse defined by the opening edge 163a of the cavity 163 and the entire area of the piston 16 (i.e., the area of the circle defined by an outer peripheral edge of the piston 16) lower than or equal to 50% (area ratio=area of ellipse/entire area of piston). This makes it possible to set the geometric compression ratio higher than or equal to 15. The area ratio is beneficially lower than or equal to 40%, and more beneficially lower than or equal to 35%.

Moreover, as a result of shifting the opening edge 163a of the cavity 163 toward the other side of the engine's output shaft, on the top surface 160 of the piston 16, the ridge 164 at the other side along the engine's output shaft becomes shorter, as clearly shown in FIG. 2. By this, the squish flow becomes weaker, which reduces the increase in the penetration of the fuel spray. Also thanks to this configuration, the fuel spray can be reliably kept from coming into contact with the wall surface of the cavity 163.

Figure 5:
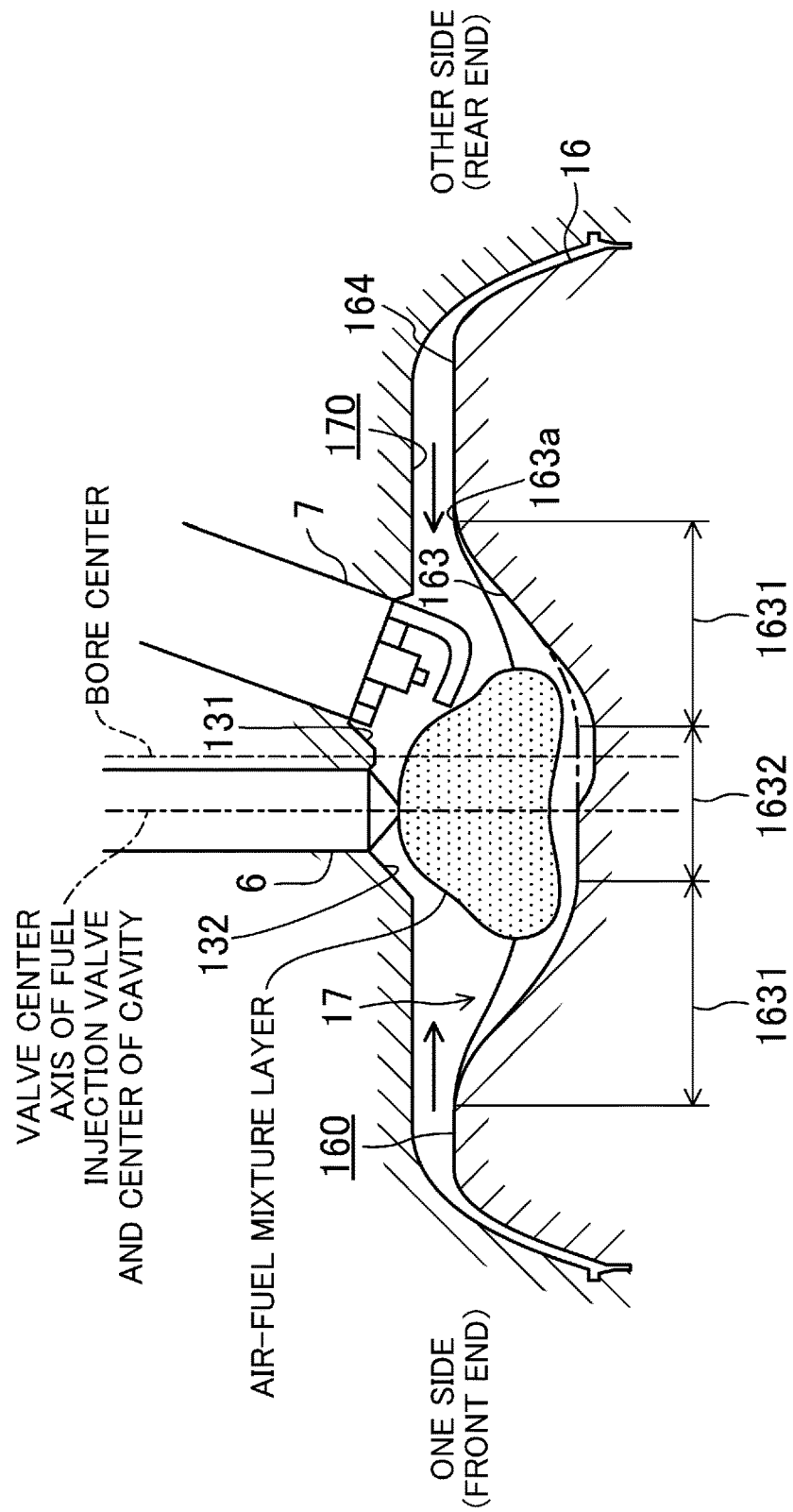
FIG. 5 is a vertical cross-sectional view illustrating a configuration of a cavity other than that of FIG. 2.

FIG. 5 illustrates an exemplary configuration different from that illustrated in FIG. 2. In the exemplary configuration shown in FIG. 5, the location of a bottom wall 1632 of a cavity 163 is changed. More specifically, in a vertical cross-section—like the one shown in FIG. 2—of the combustion chamber 17 taken along a plane passing through the injection tip of the fuel injection valve 6 and the tip of the spark plug 7, the bottom wall 1632 of the cavity 163 at the side at which the spark plug 7 is arranged is located deeper with respect to the fuel injection valve 6. As a result, the distance from the injection tip to the bottom wall 1632 of the cavity 163 at this side is longer than the distance from the injection tip to the bottom wall 1632 of the cavity 163 at the opposite side (see dash-dot line in FIG. 5). By this, even if the spray distance of the fuel spray becomes long, the fuel spray can be prevented from coming into contact with the wall surface of the cavity 163.

In the example configuration shown in FIG. 5, the location of the side wall 1631 of the cavity 163 is the same—or nearly the same—at both sides, with the injection tip of the fuel injection valve 6 between these sides. Also the location of the opening edge 163a of the cavity 163 is the same at both sides, with the injection tip of the fuel injection valve 6 being between these sides. Therefore, although not shown in the drawings, when viewing the top surface 160 of the piston 16 in plane, the opening edge 163a of the cavity 163 has the shape of a symmetrical ellipse with the valve center axis of the fuel injection valve 6 in its center. That is, in FIG. 5, the center of the cavity 163 coincides with the valve center axis of the fuel injection valve 6. Along with that, the center of the cavity 163 shifts to the side at which the fuel injection valve 6 is arranged with respect to the bore center of the cylinder 11.

As explained with reference to FIG. 4, it is beneficial if the angular range in the region where the bottom wall 1632 of the cavity 163 is located relatively deep is at least defined by lines connecting the injection tip of the fuel injection valve 6 and the borders between the two recesses 131 and 132, with the injection tip as a vertex. Note that the bottom wall 1632 of the cavity 163 may be located relatively deep in a region beyond the angular range.

Figure 6:
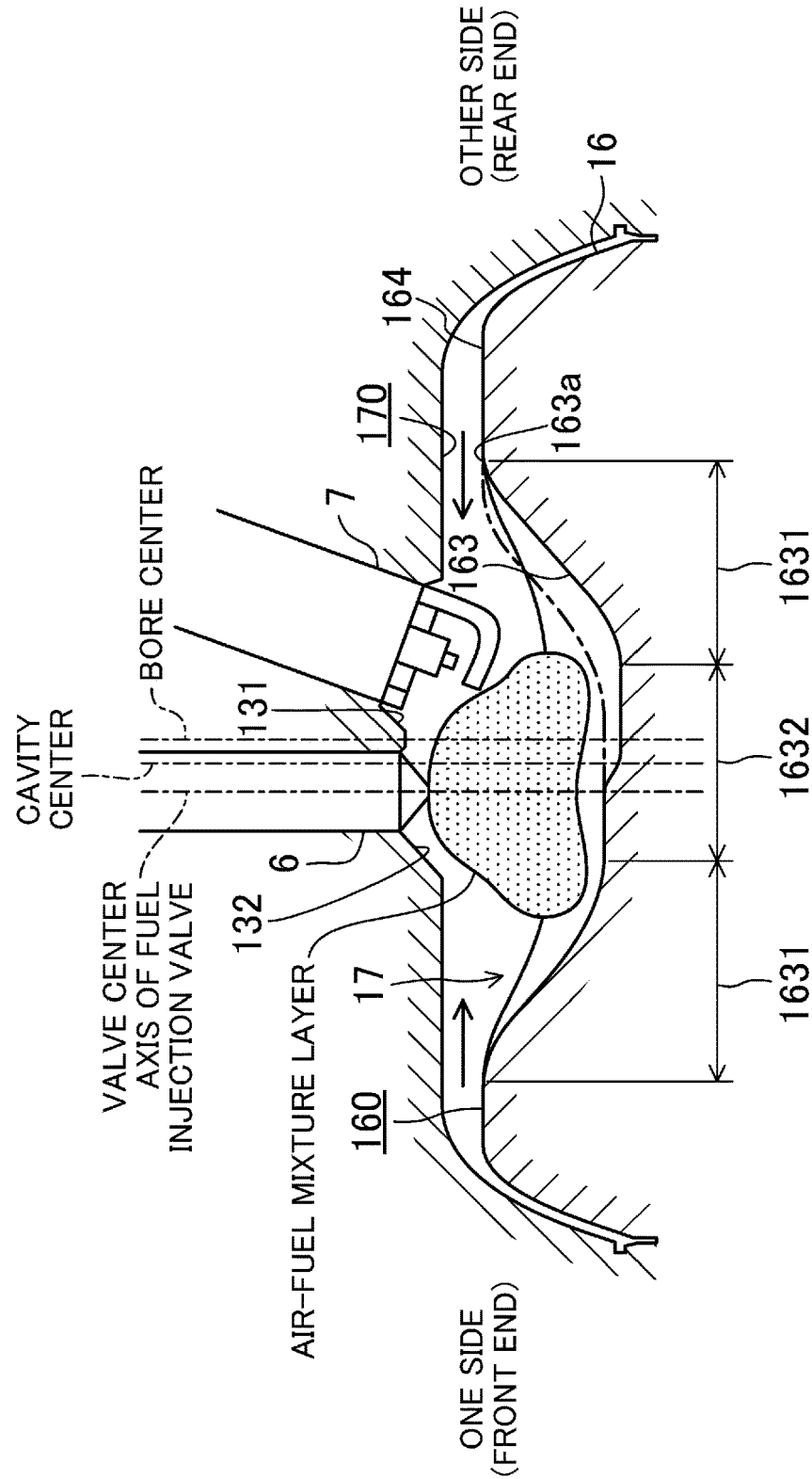
FIG. 6 is a vertical cross-sectional view illustrating a configuration of a cavity other than that of FIGS. 2 and 5.

FIG. 6 illustrates an exemplary configuration in which the configurations shown in FIGS. 2 and 5 are combined. That is, for the wall surface of the cavity 163 at the side at which the spark plug 7 is arranged with the injection tip of the fuel injection valve 6 in between, the bottom wall 1632 is located deeper to increase its distance to the injection tip, while the distance from the side wall 1631 to the injection tip is increased. By this, as the fuel spray is injected in the form of a hollow cone from the injection tip of the fuel injection valve 6 in the same manner as in the exemplary configurations shown in FIGS. 2 and 5, it is possible to prevent the fuel spray from coming into contact with the side wall 1631 and the bottom wall 1632 of the cavity 163 even if the spray distance of the fuel spray in the region where the recess 131 of the spark plug 7 is provided is long. Note that at least in the angular range defined by lines connecting the injection tip with the borders between the two recesses 131 and 132, with the injection tip of the fuel injection valve 6 as a vertex, the location of the wall surface of the cavity 163 is altered in the same manner as described above.

Figure 7:
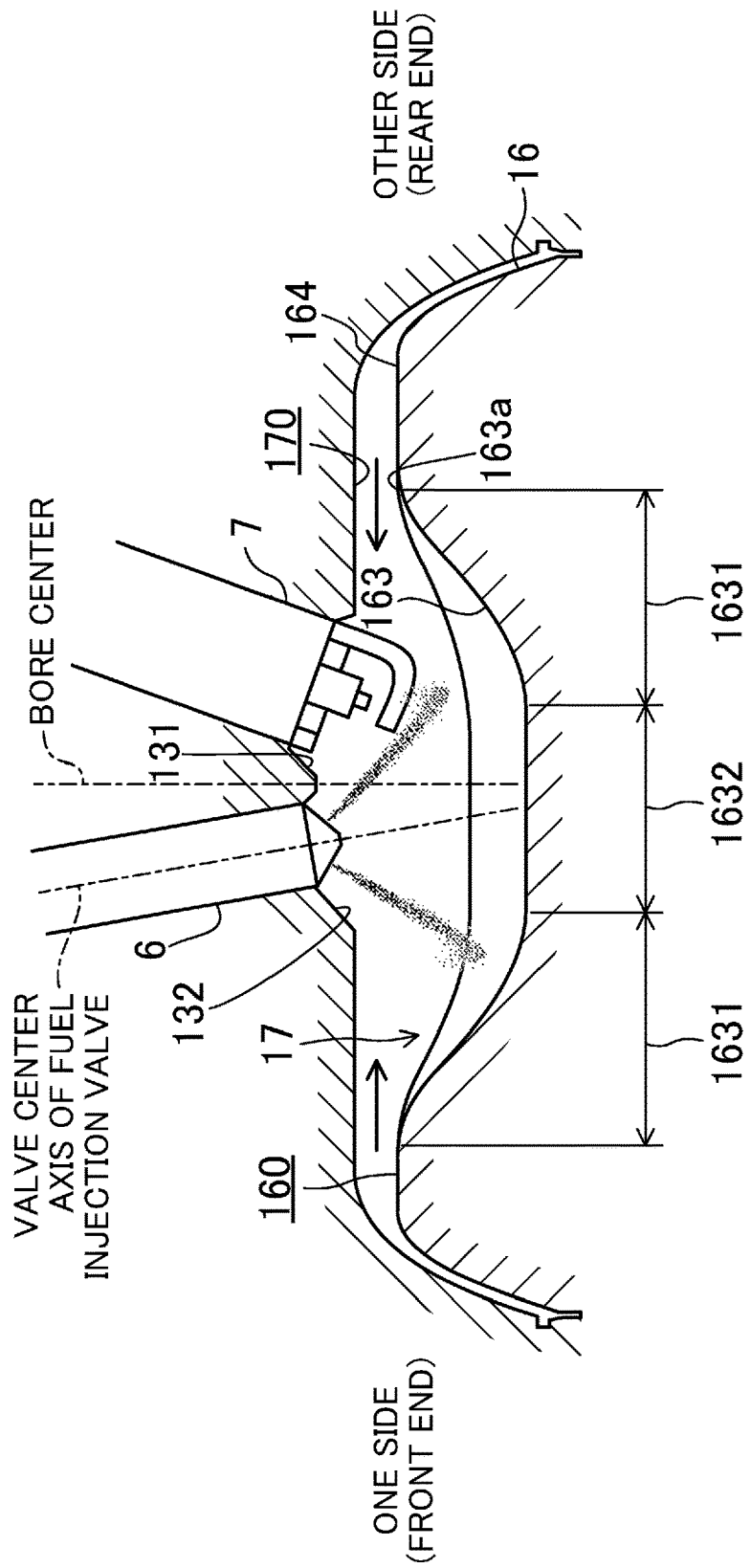
FIG. 7 is a vertical cross-sectional view illustrating a configuration, regarding the arrangement of a fuel injection valve, other than that of FIG. 2.

FIG. 7 shows an exemplary configuration in which the valve center axis of the fuel injection valve 6 shown in the exemplary configuration illustrated in FIG. 2 is shifted. In this exemplary configuration, the valve center axis of the fuel injection valve 6 is shifted toward the tip of the spark plug 7. The valve center axis of the fuel injection valve 6 is inclined on the ridge line of the pent roof. The center axis of the fuel spray, which is injected at a predetermined injection angle from the injection tip of the inclined fuel injection valve 6, is also inclined toward the tip of the spark plug 7 with respect to the axis of the cylinder 11. Therefore, in the region where the recess 131 is formed, the space surrounding the fuel spray is narrower than in the exemplary configuration shown in FIG. 2 (and FIG. 8). This reduces the amount of gas flowing from the space surrounding the fuel spray to join the fuel spray because of the gas flow and the squish flow accompanying the fuel injection. Thus, the penetration of the fuel spray can be prevented from increasing. As a result, the spray distance of the fuel spray can be prevented from becoming long, and—in combination with increasing the distance between the wall surface of the cavity 163 and the injection tip—the fuel spray can be prevented even more reliably from coming into contact with the wall surface of the cavity 163.

Further, since it is possible to shorten the spray distance of the fuel spray, it is also possible to proportionally shorten the distance between the wall surface of the cavity 163 and the injection tip. This configuration is beneficial inasmuch as the geometric compression ratio of the engine 1 is improved as the capacity of the cavity 163 provided on the top surface 160 of the piston 16 is minimized.

Note that in the example shown in FIG. 7, by inclining the valve center axis of the fuel injection valve 6, the center axis of the fuel spray injected at a predetermined injection angle is inclined with respect to the axis of the cylinder 11. Alternatively, however, a fuel injection valve 6 which is configured such that the center axis of the fuel spray injected is inclined with respect to the valve center axis of the fuel injection valve 6, may be employed. For example, in a multi-hole fuel injection valve, the center axis of the fuel spray can be tilted with respect to the valve center axis of the fuel injection valve by tilting injection holes of the multi-hole fuel injection valve. Moreover, also in a swirl injector, the center axis of the fuel spray can be tilted with respect to the valve center axis of the fuel injection valve by tilting injection holes of the multi-hole fuel injection valve. Although not shown in the drawings, if employing such a fuel injection valve, the valve center axis of the fuel injection valve is arranged along the axis of the cylinder 11. On the other hand, the center axis of the fuel spray injected from the fuel injection valve is inclined with respect to the axis of the cylinder. Thanks to the recess 131, the fuel spray can be prevented from being sprayed unevenly. Arranging the valve center axis of the fuel injection valve 6 along the axis of the cylinder 11 can prove beneficial for the layout of the fuel injection valve 6.

Furthermore, the ignition electrode including the spark plug 7 is shifted from the ridge line of the pent roof.

DESCRIPTION OF REFERENCE CHARACTERS

1 Engine
11 Cylinder
13 Cylinder Head
131 Recess
132 Recess (Second Recess)
16 Piston
160 Top Surface (of Piston)
161 Inclined Surface
162 Inclined Surface
163 Cavity
1631 Side Wall (Wall Surface of Cavity)
1632 Bottom Wall (Wall Surface of Cavity)
17 Combustion Chamber
170 Ceiling Portion
171 Intake Side Inclined Surface
172 Exhaust Side Inclined Surface
18 Intake Port
19 Exhaust Port
6 Fuel Injection Valve
7 Spark Plug (Ignition Electrode)

The invention claimed is:

1. A structure of a combustion chamber for a direct-injection engine, the structure comprising:
   a piston inserted into a cylinder and having a cavity recessed from a top surface of the piston;
   a ceiling portion, of a cylinder head, including a ceiling surface which defines the combustion chamber together with an inner peripheral surface of the cylinder and the top surface of the piston;
   a fuel injection valve having an injection tip, which is arranged on the ceiling portion of the cylinder head such that the injection tip faces an inside of the combustion chamber, and from which fuel is injected at a predetermined spray angle toward the cavity; and
   an ignition electrode having a tip, which faces the interior of the combustion chamber at the ceiling portion of the cylinder head, and which is arranged adjacent to the injection tip of the fuel injection valve, wherein
   a recess, which is recessed from the ceiling surface and which accommodates the tip of the ignition electrode, is formed at a location on the ceiling portion of the cylinder head adjacent to the injection tip of the fuel injection valve,
   a center of the cavity is shifted with respect to a bore center of the cylinder, in a vertical cross-section of the combustion chamber taken along a plane passing through the injection tip of the fuel injection valve and the tip of the ignition electrode, a distance from the injection tip to a wall surface of the cavity at a side at which the ignition electrode is provided is longer than a distance from the injection tip to a wall surface of the cavity at an opposite side, with the injection tip of the fuel injection valve being between the wall surface at the side at which the ignition electrode is provided and the wall surface at the opposite side,
   on the ceiling portion of the cylinder head, a second recess, which accommodates the injection tip of the fuel injection valve, is provided recessed from the ceiling surface,
   the recess accommodating the tip of the ignition electrode and the second recess accommodating the injection tip of the fuel injection valve partly overlap, and
   when viewing the combustion chamber in plane at a vertical cross-section taken along a plane passing through a predetermined location within an angular range and through the injection tip, in the angular range, which has the injection tip of the fuel injection valve as a vertex and which is defined by lines connecting the injection tip and borders between the recess and the second recess, a distance from the injection tip to a wall surface of the cavity at the predetermined location is longer than a distance from the injection tip to a wall surface of the cavity at a symmetrical location at an opposite side with respect to the predetermined location, with the injection tip being between the wall surface at the predetermined location and the wall surface at the symmetrical location.

2. The structure of claim 1, wherein
   when viewing the top surface of the piston in plane, an opening edge of the cavity has the shape of an ellipse with a long axis passing through the injection tip of the fuel injection valve and the tip of the ignition electrode.

3. The structure of claim 2, wherein
   the fuel injection valve is shifted with respect to the bore center of the cylinder,
   the ignition electrode is arranged at an opposite side of a side at which the fuel injection valve is arranged, with the bore center of the cylinder being between the side and the opposite side, and
   the center of the cavity is shifted toward the side at which the fuel injection valve is arranged with respect to the bore center of the cylinder.

4. The structure of claim 1, wherein
   the ceiling portion of the cylinder head includes an intake side inclined surface provided with an opening portion of an intake port and an exhaust side inclined surface provided with an opening portion of an exhaust port, and defines the combustion chamber, which has the shape of a pent-roof,
   the top surface of the piston has inclined surfaces on an intake side and an exhaust side, and is raised by the inclined surfaces to correspond to the intake-side inclined surface and the exhaust-side inclined surface of the ceiling portion,
   the injection tip of the fuel injection valve on the ceiling portion of the cylinder head is arranged on a ridge line of the pent roof at which the intake-side inclined surface and exhaust-side inclined surface intersect with each other, and the tip of the ignition electrode on the ridge line of the pent roof is arranged adjacent to the injection tip of the fuel injection valve.

5. The structure of claim 1, wherein the fuel injection valve is arranged such that a valve center axis of the fuel injection valve is parallel to an axis of the cylinder.

6. The structure of claim 1, wherein the fuel injection valve is arranged such that a valve center axis of the fuel injection valve is inclined with respect to an axis of the cylinder in a direction in which a center axis of fuel spray, which is injected from the injection tip at a predetermined spray angle, becomes closer to the ignition electrode.

7. The structure of claim 1, wherein a geometric compression ratio is higher than or equal to 15.

\* \* \* \* \*